(12) United States Patent
Malkin

(10) Patent No.: US 6,243,380 B1
(45) Date of Patent: *Jun. 5, 2001

(54) METHOD AND APPARATUS FOR MAPPING ASYNCHRONOUS PORTS TO HDLC ADDRESSES

(75) Inventor: Gary Malkin, Lowell, MA (US)

(73) Assignee: Nortel Networks Limited, Montreal (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/707,871

(22) Filed: Sep. 9, 1996

(51) Int. Cl.⁷ .................................................. H04L 12/56
(52) U.S. Cl. .......................................... 370/392; 370/428
(58) Field of Search ..................................... 370/389, 392, 370/400, 401, 409, 410, 420, 428, 465, 466, 467, 471, 474, 475; 395/200.47, 200.48, 200.57, 200.58, 200.68, 200.72; 709/217, 218, 227, 228, 238, 242

(56) References Cited

U.S. PATENT DOCUMENTS 5,416,771 * 5/1995 Iwata .................................... 370/410

* cited by examiner

Primary Examiner—Wellington Chin
Assistant Examiner—Kwang B. Yao
(74) Attorney, Agent, or Firm—Blakely Sokoloff Taylor & Zafman LLP

(57) ABSTRACT

The present invention provides a method and apparatus for transmitting packets. One embodiment of the present invention includes an access server receiving a packet from a first unit through a first interface of a plurality of interfaces. The access server maps the packet into a first frame to transmit the packet over a predetermined point-to-point connection. An interface number representing the first interface is stored in an address field of the first frame. The first frame is then forwarded via the point-to-point connection to a second unit. The second unit maps a response to the packet into a second frame and stores the interface number representing the first interface in an address field of the second frame. The second unit then forwards the second frame to the access server. Upon receipt, the access server reads the address field of the frame to determine through which interface the response is to be forwarded.

32 Claims, 4 Drawing Sheets

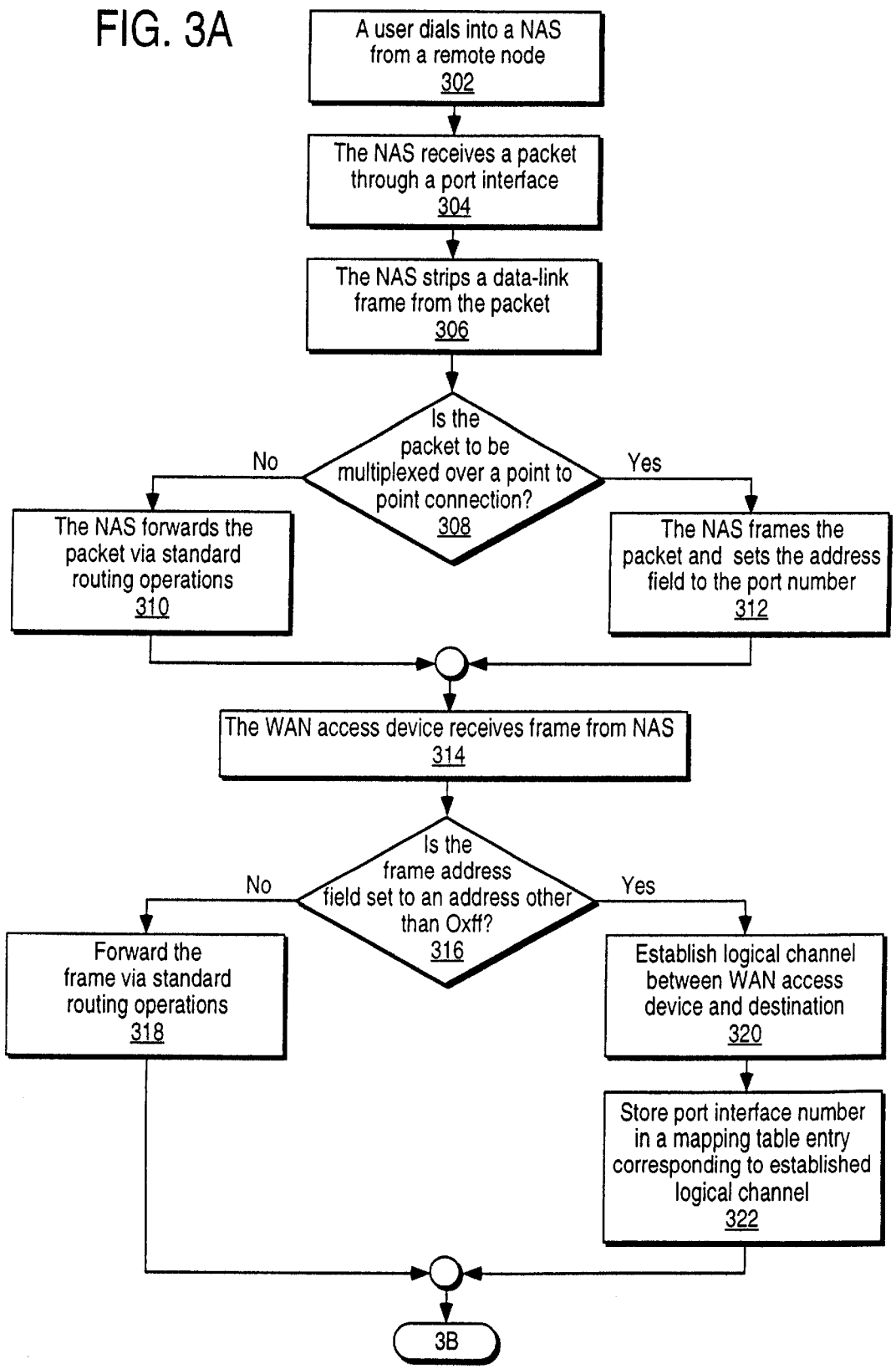

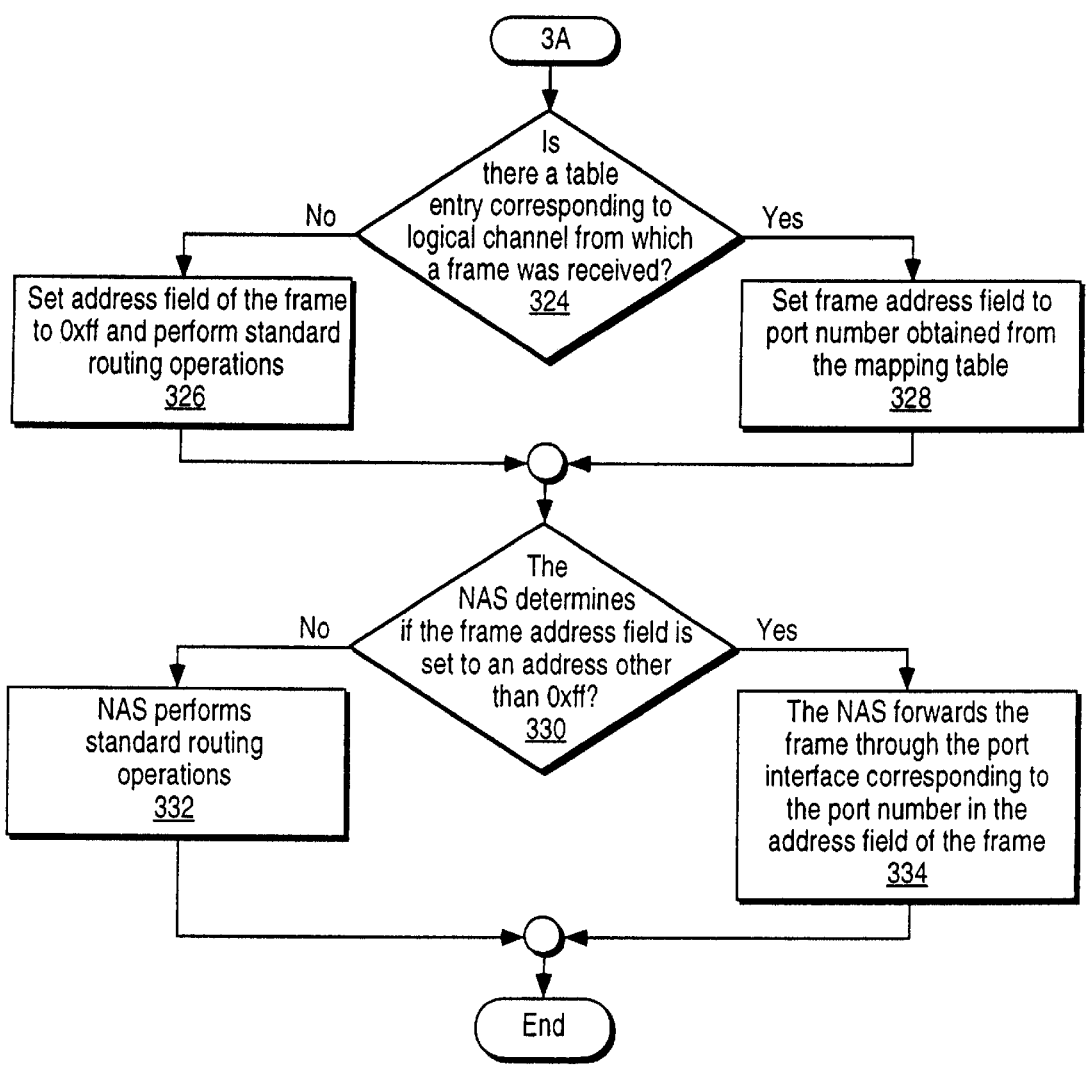

METHOD AND APPARATUS FOR MAPPING ASYNCHRONOUS PORTS TO HDLC ADDRESSES

FIELD OF THE INVENTION

The invention relates generally to computer networking systems, and, in particular, to addressing frames of data.

BACKGROUND OF THE INVENTION

Typically, when a remote node 152 uses a service provider to establish a remote connection with a separate network, the remote node 152 will dial into the service provider's local Network Access Server (NAS) 154. As shown in FIG. 1, the NAS 154 usually includes several port interfaces. Each remote node dials into the NAS 154 through a separate port interface. Data received through interfaces may in turn be multiplexed over one synchronized line 156 providing a connection to a Wide Area Network (WAN) access device 260.

The data is usually transmitted between the remote nodes and the NAS 154 over an asynchronous line (e.g. telephone line). Therefore, the NAS typically needs to frame the packets of data received from the remote node into data-link control protocol frames (e.g. High-level Data Link Control (HDLC)) in order to transmit the packets over the synchronous line 156. (References herein to the data-link layer and the network layer are references to the Open Systems Interconnection (OSI) model developed by the International Standardization Organization).

As shown in FIG. 1, the synchronous line 156 between the NAS 154 and the WAN access device 160 is usually a point-to-point connection. That is, a connection with out any intervening nodes or switches.

As a result of the point-to-point nature of the connection, the address field of the data-link frame is not used because the frame has only one possible destination once it is transmitted. Usually, the address field of a data-link frame is used to indicate the physical destination of the frame so that any switches between a frame's source and destination will be able to read the frame's address field and know where to forward the frame. However, when it is known that there will be no intervening switches between the frame's source and destination (e.g. point-to-point connection) no address is necessary. In fact, the RFC 1662 states that for point-to-point connections, the address field of the HDLC frame should contain 0xFF.

When the NAS 154 receives responses from the WAN access device 160, the NAS 154 usually performs a routing function to determine where the response is to be forwarded. That is, the NAS 154 will strip the response packet from its data-link frame and read the packet's address information, which is usually provided at the network layer (e.g. the Internet Protocol (IP) address). The routing procedures, however, slow down the transmission of the responses and usually only work if the node to which a response is being delivered, has been given a network address.

In the case of a user dialing into a NAS 154 from a unit that does not have a network address (e.g. a terminal), the NAS will usually assign a network address to each packet received from that unit. The assigned network addresses will in turn will be used by the NAS to forward responses using the routing procedures described above. Assigning network addresses, however, has the disadvantage of preallocating several network addresses, when in fact, some of these addresses may not be used.

Therefore, what is needed is a way for an access server to forward data-link frames received from a point-to-point connection without having to perform routing operations.

SUMMARY OF THE INVENTION

The present invention provides a method and apparatus for transmitting packets. One embodiment of the present invention includes an access server receiving a packet from a first unit through a first interface of a plurality of interfaces. The access server maps the packet into a first frame to transmit the packet over a predetermined point-to-point connection. An interface number representing the first interface is stored in an address field of the first frame. The first frame is then forwarded via the point-to-point connection to a second unit.

The second unit maps a response to the packet into a second frame and stores the interface number representing the first interface in an address field of the second frame. The second unit then forwards the second frame to the access server.

Upon receipt, the access server reads the address field of the second frame to determine through which interface the response is to be forwarded.

BRIEF DESCRIPTION OF THE DRAWINGS

The present invention is illustrated by way of example and not limitation in the figures of the accompanying drawings, in which like references indicate similar elements, and in which:

FIG. 3a illustrates a flow diagram describing the step of the present invention according to one embodiment.

FIG. 3b illustrates a flow diagram describing the step of the present invention according to one embodiment.

DETAILED DESCRIPTION

A method and apparatus is described for having a NAS forward data-link layer frames received from a point-to-point connection without performing routing operations.

In the following description, numerous specific details are set forth in order to provide a thorough understanding of the present invention. It will be apparent, however, to one of ordinary skill in the art that the present invention may be practiced without these specific details. In other instances, well-known standards, structures, and techniques have not been shown in order not to unnecessarily obscure the present invention.

Figure 1:
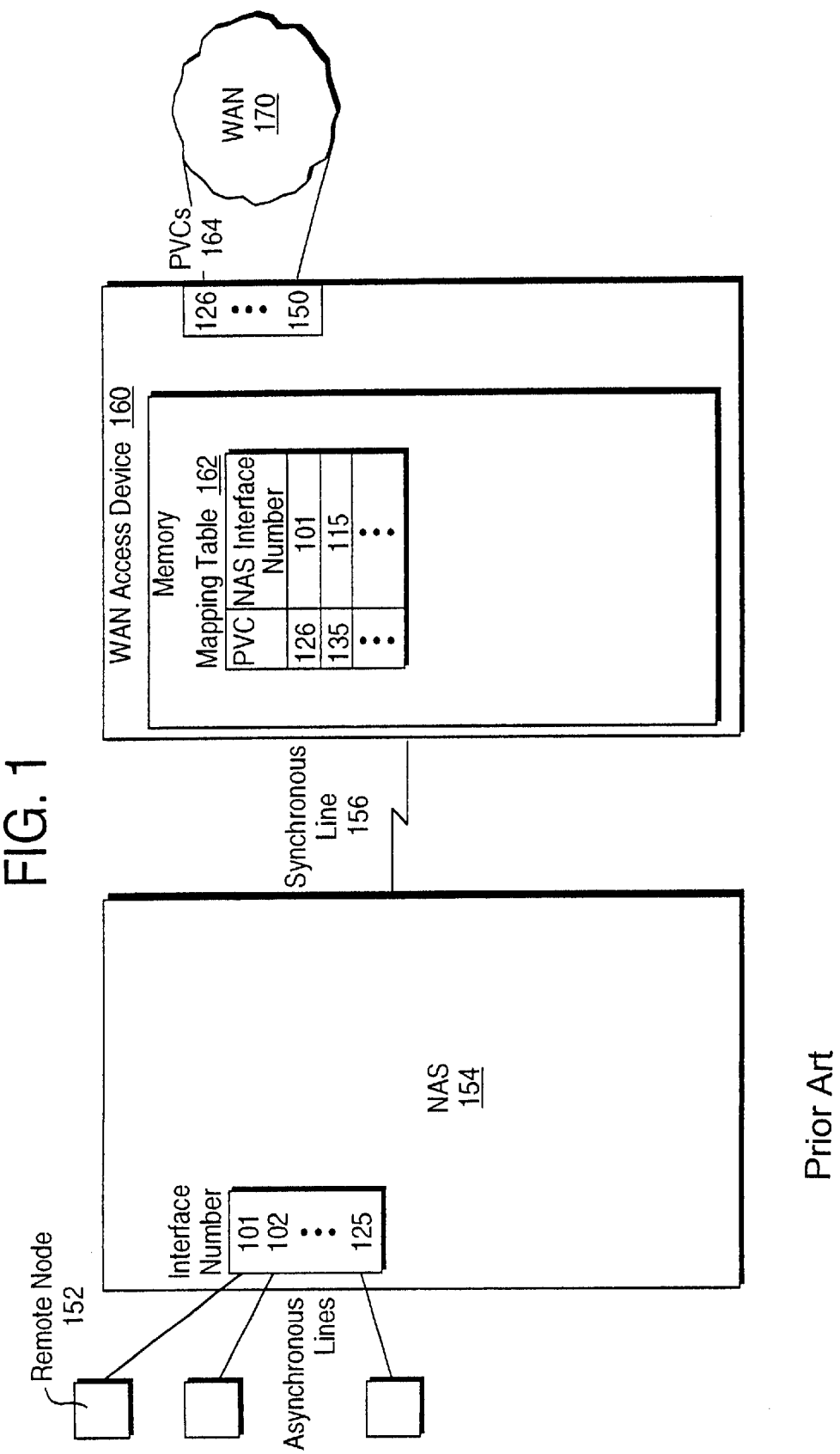
FIG. 1 illustrates a prior art network configuration.
Figure 2:
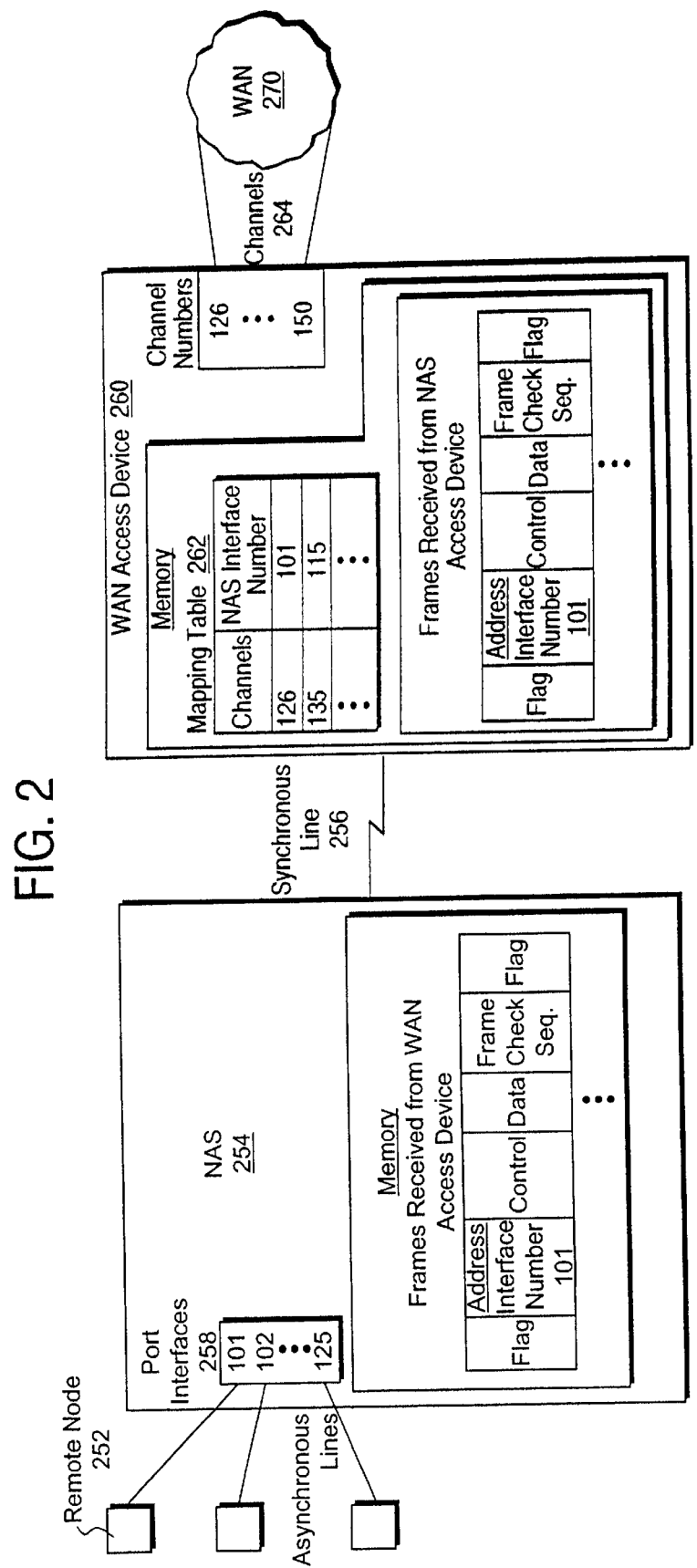
FIG. 2 illustrates a network configuration capable of implementing the present invention according to one embodiment.

Referring to FIG. 2, a network configuration is shown, which is capable of implementing the present invention to one embodiment. As shown, a remote node 252 dials into the NAS 254, when attempting to establish a connection through the WAN 270. The remote node sends a packet of information to the NAS 254 across an asynchronous line. The information is received by the NAS through one of the NAS's several port interfaces 258.

The packet of information received from a remote node 252 is framed by the NAS into a data-link frame to be sent to the WAN access device 260. In the present invention, the number of the port interface through which the packet was received is mapped into the address field of the data-link frame.

As shown in FIG. 2, the line connecting the NAS 254 and the WAN access device 260 is a point-to-point connection. In one embodiment, the line is also synchronous connection.

Once the WAN access device 260 receives the data-link frame from the NAS 254, the WAN access device 260 establishes a logical channel 264 between the WAN access device 260 and a WAN 270. Afterwards, the WAN access device stores the number of the NAS port interface, through which the NAS received the packet, into a table entry corresponding to channel established between the WAN access device 260 and the WAN 270. The table entry is included in a mapping table 262 stored at the WAN access device.

When the WAN access device 260 receives a response over one of its channels 264, the WAN access device checks its mapping table 262 to see if a NAS port interface number has been stored in a table entry corresponding to the channel over which the response was received. If a NAS port interface number is present in the table entry, the port interface number is mapped into the address field of the data-link frame when the response is framed. The data-link frame is then sent to the NAS 254 over the point-to-point connection.

When the NAS 254 receives the response, rather than performing a standard routing procedure of the response, the NAS 254 reads the address field of the data-link frame. The NAS then forwards the response through the NAS port interface corresponding with the port interface number represented in the address field of the data-link frame. As a result, the NAS 254 is able to forward data-link frames received from the point-to-point connection faster than had it performed standard routing operations.

Referring to FIG. 3, a flow diagram is shown describing the steps of one embodiment of the invention in more detail. At step 302, a user dials into a NAS through a remote node and transmits a packet of information to the NAS. In one embodiment, the connection between the remote node and the NAS is an asynchronous line.

In step 304, the packet is received by the NAS through one of several port interfaces, each of which is assigned a port interface number. The NAS, in step 306, then strips the asynchronous data-link frame from the packet.

In step 308, the NAS determines whether the packet is to be multiplexed over a point-to-point connection with a WAN access device (e.g. a Frame Relay Access Device). For example, in one embodiment, the NAS predetermines that all packets of data received on a particular set of port interfaces are to be multiplexed over a particular synchronized point-to-point connection line. In addition, the point-to-point connection may provided a connection between the NAS and a device other than a WAN access device without departing from the scope of the invention.

If the NAS determines that the packet is not to be multiplexed (i.e. was not received via one of the specified interfaces), in step 310 standard routing operations are performed to determine the next hop for the packet and the interface through which the packet should be forwarded.

If, on the other hand, it is determined in step 308 that the packet is to be multiplexed over the synchronized point-to-point connection, then in step 312 the NAS frames the packet into a data-link control protocol (e.g. HDLC). In particular, the NAS maps the number of the NAS port interface through which the packet was received, into the destination address field of the data-link frame. Recall that RFC 1662 states that ordinarily in the case of a point-to-point connection the destination field in a data-link control protocol should be set to all ones because there are no alternative destinations on the point-to-point connection and no address is necessary.

In step 314, the WAN access device attached to the other end of the point-to-point connection receives the frame transmitted from the NAS. In step 316, the WAN access device reads the destination address field of the frame to determine whether the address field contains 0xff or some other address.

If the WAN access device determines that the destination address field contains 0xff, in step 318, the WAN access device forwards the packet by performing standard routing procedures. This typically includes stripping off the data-link frame and reading the destination address information provided in the network layer header of the packet.

If, on the other hand, the WAN access device determines that a number other than 0xff is provided in the address field of the frame, in step 320 the WAN access device establishes a direct logical channel (e.g. a permanent virtual circuit) between the WAN access device and the ultimate destination of the packet. In step 322, the WAN access device then stores the NAS port interface number provided in the address field of the data-link frame. In one embodiment, the interface number is stored in a mapping-table, and in particular, it is stored in a table-entry corresponding to the logical channel through which the packet has been forwarded from the WAN access device.

When the WAN access device receives a response packet from the network 270 to which it is providing access, in step 324 the WAN access device determines if the channel over which the response was received has a corresponding entry in the mapping-table. If the WAN access device determines no entry exist for the logical channel over which the response was received, in step 326 the WAN access device performs standard routing procedures to determine the next hop for the packet and the interface over which the packet is to be forwarded. In particular, if the packet is to be forwarded over the point-to-point connection 256 to the NAS 254, the packet is framed into a data-link frame and the address field of the frame is set to 0xff. The packet is then forwarded over the synchronous line.

If an entry in a table storing interface numbers is provided for the logical channel over which the packet was received, in step 328, the WAN access device frames the packets in a data-link frame. In particular, the WAN access device stores the NAS port interface number, which was stored in the table entry corresponding to the logical channel over which the packet was received, into the destination address field of the data-link frame. The packet is then forwarded over the NAS 254 over the point-to-point connection 256.

When the NAS receives a data-link frame over the point-to-point line 256, in step 330, the NAS reads the destination address field of the data-link frame to determine if the frame has a destination address of 0xff (i.e. it was routed) or has another address. If the packet has a data-link frame address of 0xff, in step 332, the NAS performs standard routing procedures and forwards the packet.

On the other hand, if the address field of the data-link frame is a port interface number (i.e. any number other than 0xff), in step 334, the NAS bypasses the routing procedure and forwards the packet over the port interface specified in the destination address of the data-link frame.

As a result, the present invention provides the increased performance advantage of forwarding packets received from point-to-point connections without having to perform routing operations on the packet.

Moreover, it should be understood that the asynchronous line connecting the remote node and the NAS could be an Integrated Service Digital Network (ISDN) without requiring any changes to the implementation of the present invention because each ISDN line is understood to be uniquely identifiable with a simple number logically indistinguishable from the number of a port interface.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchange (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services.

The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

The present invention may be implemented on a storage medium having stored thereon instructions which can be used to program a computer to perform the present invention. The storage medium can include, but is not limited to, any type of disk including floppy disks, optical disks, CD-ROMs, and magneto-optical disks, ROMs, RAMs, EPROMs, EEPROMs, magnet or optical cards, or any type of media suitable for storing electronic instructions. Alternatively, the present invention could be implemented in discrete hardware components such as large-scale integrated circuits (LSI's), application-specific integrated circuits (ASIC's) or in firmware.

Moreover, in the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for transmitting packets comprising:
   receiving a packet of data through a first port interface of a plurality of port interfaces;
   mapping the data into a first data-link frame for transmission over a predetermined point-to-point connection;
   storing, in a destination address field of the first data-link frame, an interface number representing the first port interface in place of a physical destination address of the first data-link frame;
   forwarding the first data-link frame via the point-to-point connection from a first unit to a second unit;
   establishing a first logical channel between the second unit and a destination of the data;
   storing in a table accessible by the second unit, the interface number representing the first port interface being stored in an entry of the table corresponding to the first logical channel;
   reading the table by the second unit to determine if the interface number has been stored in a table entry corresponding to the first logical channel in response to receiving a packet over the first logical channel;
   in response to the interface number being stored in the table entry corresponding to the first logical channel, mapping the packet by the second unit into a second data-link frame and storing, in the address field of the second data-link frame, the interface number representing the first port interface;
   receiving from the second unit the second data-link frame in response to the first data-link frame, the interface number, representing the first port interface, is stored in an address field of the second data-link frame; and
   reading the address field of the second data-link frame to determine through which interface the response is to be forwarded.

2. The method of claim 1, wherein the first data-link frame is a High-Level Data Link Control protocol frame.

3. The method of claim 2, wherein the first unit includes a network access server and the second unit includes a wide area network (WAN) access device providing a connection to a WAN.

4. The method of claim 1, wherein the data is transmitted to the first unit via an asynchronous transmission line, and the point-to-point connection between the first unit and the second unit is a synchronous transmission line.

5. The method of claim 1, wherein the first unit is a network access server implemented in a switching system product.

6. The method of claim 1, wherein the second unit is a wide area network (WAN) access device implemented in a transmissions system product.

7. An apparatus comprising:
   a network access server to receive a packet through a first port interface of a plurality of interfaces, to map the packet into a first frame, to store, in a destination address field of the first frame, an interface number representing the first port interface in place of a physical destination address of the first frame, and to transmit the first frame over a predetermined point-to-point connection; and
   a wide area network (WAN) access device to establish a first logical channel between the WAN access device and a destination of the packet, to store the interface number representing the first port interface of the network access server in an entry of a table corresponding to the first logical channel, to read the table in response to receiving a packet over the first logical channel, to determine if the interface number has been stored in the entry, and to map the response into a second frame and store the interface number representing the first port interface in an address field of the second frame for return to the network access server over the predetermined point-to-point connection.

8. The apparatus of claim 7, wherein said first frame is a High-Level Data-Link Control protocol frame.

9. The apparatus of claim 7 further comprising an asynchronous transmission line coupled to the first port interface.

10. The apparatus of claim 7, wherein the point-to-point connection between the network access server and the WAN access device includes a synchronous transmission line.

11. The apparatus of claim 7, wherein the network access server and the WAN access device are implemented in a switching system product.

12. The apparatus of claim 7, wherein the network access server and the WAN access device are implemented in a transmissions system product.

13. A computer-readable medium having stored thereon a plurality of instructions executable by a processor, the plurality of instructions comprising:

a first set of executable instructions to map information associated with a packet received through a first port interface of a plurality of interfaces into a first frame, to store in a destination address field of the first frame an interface number representing the first port interface in place of a physical destination address of the first frame, and to transmit the first frame over a predetermined connection to a wide area network (WAN) access device; and a second set of executable instructions to (i) receive from the WAN access device a second frame in response to the first frame, the second frame having a destination address field containing the interface number representing the first port interface, and (ii) read the address field of the second frame to determine that the response is to be forwarded through the first port interface.

14. The computer-readable medium of claim 13, wherein the first frame is a High-Level Data Link Control protocol frame.

15. The computer-readable medium of claim 14, wherein the WAN access device providing a connection to a WAN.

16. The computer-readable medium of claim 15, wherein the plurality of instructions further includes:

a third set of executable instructions to establish, via the WAN access device, a first logical channel between the WAN access device and a destination of the packet;

a fourth set of executable instructions to store in a table, via the WAN access device, the interface number representing the first port interface, the interface number stored in an entry of the table corresponding to the first logical channel;

a fifth set of executable instructions to read the table, via the WAN access device, to determine if the interface number has been stored in a table entry corresponding to the first logical channel in response to receiving a packet over the first logical channel; and a sixth set of executable instructions which, in response to the interface number being stored in the table entry corresponding to the first logical channel, map via the WAN access device the response into the second frame and store in the address field of the second frame the interface number representing the first port interface.

17. The computer-readable medium of claim 13, wherein the packet having information mapped by the first set of instructions is transmitted to the first unit via an asynchronous transmission line, and the connection between the first unit and the WAN access device is a synchronous transmission line.

18. The computer-readable medium of claim 13 implemented in a switching system product.

19. The computer-readable medium of claim 13 implemented in a transmissions system product.

20. A method for transmitting packets comprising:

receiving a packet from a first device;

establishing a first logical channel with a destination of the packet;

storing in a table an interface number representing a first port interface of the first device, the interface number stored in an entry of the table corresponding to the first logical channel;

routing the packet to the destination; and upon receiving a response, being data in response to the packet, from the destination over the first logical channel, mapping the response into a frame and the interface number into an address field of the frame.

21. The method of claim 20, wherein a second device, receiving the packet from the first device, is a wide area network access device implemented in a switching system product.

22. The method of claim 20, wherein a second device, receiving the packet from the first device, is a wide area network access device implemented in a transmissions system product.

23. An apparatus comprising:

means for receiving a packet from a first device;

means for establishing a first logical channel with a destination of the packet;

means for storing an interface number representing a first port interface of the first device in a entry of a table, the interface number corresponding to the first logical channel; and means for mapping data responsive to the packet from the destination into a frame and for mapping the interface number into an address field of the frame.

24. The apparatus of claim 23, wherein the mapping means is implemented in a switching system product.

25. The apparatus of claim 23, wherein the mapping means is implemented in a transmissions system product.

26. A computer-readable medium having stored thereon a plurality of instructions including a first set of instructions executed by a processor, comprising:

instructions executed to control a receipt of a packet from a network access server;

instructions to control an establishment of a first logical channel between a WAN access device and a destination of a packet;

instructions to control a storage of an interface number in a table, the interface number representing a first port interface of the network access server, the interface number stored in an entry of the table corresponding to the first logical channel; and instructions that in response to receiving a packet from the destination over the first logical channel, control a mapping of the packet into a frame and a mapping of the interface number into an address field of the frame.

27. The computer-readable medium of claim 26 is implemented in a switching system product.

28. The computer-readable medium of claim 26 is implemented in a transmissions system product.

29. A method comprising:

receiving a packet of data through a first port interface of a plurality of port interfaces;

mapping the data into a first data-link frame for transmission over a predetermined connection;

placing a port interface number of the first port interface into an address field of the first data-link frame; and receiving a second data-link frame in response to the first data-link frame, the second data-link frame including (i) a response to the packet and (ii) an address field containing the first port interface to provide forwarding information of the response without using a routing protocol.

30. The method of claim 29, wherein the connection is a point-to-point connection.

31. The method of claim 29, wherein prior to receiving the second data-link frame, the method further comprises transmitting the first data-link frame to a wide area network (WAN) access device.

32. The method of claim 31, after transmission of the first data-link frame, the method further comprises:

establishing a first logical channel between the WAN access device and a destination of the packet;

storing the port interface number in an entry of a table, the port interface number corresponding to the first logical channel;

in response to receiving a packet over the first logical channel, reading the table to determine if the port interface number has been stored in the entry corresponding to the first logical; and in response to the port interface number being stored in the table entry corresponding to the first logical channel, mapping the packet into the second data-link frame and storing in the address field of the second data-link frame.

\* \* \* \* \*

UNITED STATES PATENT AND TRADEMARK OFFICE
CERTIFICATE OF CORRECTION

PATENT NO.   : 6,243,380 B1                                          Page 1 of 1
DATED        : June 5, 2001
INVENTOR(S)  : Malkin It is certified that error appears in the above-identified patent and that said Letters Patent is hereby corrected as shown below:

<u>Title page,</u>
Item [56], References Cited, U.S. PATENT DOCUMENTS, insert the following entries:

|  |  |  |  |  |
|---|---|---|---|---|
| -- 4,933,937 * | 6/1990 | Konishi | 370 | 404 |
| 5,140,585 * | 8/1992 | Tomikawa | 370 | 354 |
| 5,425,026 * | 6/1995 | Mori | 370 | 410 |
| 5,440,541 * | 8/1995 | Iida | 370 | 352 |
| 5,448,564 * | 9/1995 | Thor | 370 | 392 |
| 5,526,489 * | 6/1996 | Nilakantan et al. | 395 | 200.58 |
| 5,583,996 * | 12/1996 | Tsuchiya | 395 | 200.48 |
| 5,636,216 * | 6/1997 | Fox et al. | 370 | 402 |
| 5,657,314 * | 8/1997 | McClure et al. | 370 | 401 --. |

<u>Column 7,</u>
Line 6, before "interfaces" insert -- port --.

Signed and Sealed this

Eighteenth Day of May, 2004

JON W. DUDAS
*Acting Director of the United States Patent and Trademark Office*